United States Patent
Lim et al.

(10) Patent No.: US 9,800,425 B2
(45) Date of Patent: Oct. 24, 2017

(54) MULTIPLE MULTICAST NETWORK SYSTEM AND METHOD FOR ENSURING RELIABILITY

(71) Applicant: SAMSUNG ELECTRONICS CO., LTD., Suwon-si (KR)

(72) Inventors: Sung Hoon Lim, Yongin-si (KR); Kwang Taik Kim, Yongin-si (KR); Kwang Hoon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 187 days.

(21) Appl. No.: 14/518,612

(22) Filed: Oct. 20, 2014

(65) Prior Publication Data

US 2015/0229484 A1   Aug. 13, 2015

(30) Foreign Application Priority Data

Feb. 11, 2014   (KR) .................. 10-2014-0015719

(51) Int. Cl.
*H04L 12/18* (2006.01)

(52) U.S. Cl.
CPC ...... *H04L 12/1863* (2013.01); *H04L 12/1868* (2013.01)

(58) Field of Classification Search
CPC ..... H04L 12/1863; H04L 5/16; H04L 1/0076; H04W 74/00
See application file for complete search history.

(56) References Cited

U.S. PATENT DOCUMENTS

| | | | |
|---|---|---|---|
| 2005/0076369 A1* | 4/2005 | Cai | H04L 12/185 725/62 |
| 2005/0272455 A1* | 12/2005 | Oommen | H04W 4/08 455/518 |
| 2009/0196304 A1* | 8/2009 | Sayenko | H04L 5/0007 370/432 |
| 2010/0146357 A1* | 6/2010 | Larsson | H04L 1/1845 714/750 |
| 2010/0214970 A1* | 8/2010 | Brunner | H04L 1/1887 370/312 |
| 2013/0107764 A1* | 5/2013 | Zeger | H04L 5/16 370/280 |
| 2016/0135026 A1* | 5/2016 | Liang | H04W 4/023 455/456.1 |

* cited by examiner

*Primary Examiner* — Jeffrey M Rutkowski
*Assistant Examiner* — Fangyan Deng
(74) *Attorney, Agent, or Firm* — NSIP Law

(57) ABSTRACT

A multiple multicast network system and method for ensuring reliability in such a network are provided. A multiple multicast method in a multiple multicast network system may include grouping terminals having data to be transmitted to each other in a group. The method transmits, by each of the terminals in the group, data of each of the terminals to the other terminals in the group. In response to receiving the data, the method provides, to the terminals in the group, as feedback, missing packet information, and generates, by a terminal among the terminals in the group, a secondary network-coded packet by performing network coding based on a successfully received packet and data of each of the terminal, and transmits the secondary network-coded packet to the other terminals in the group based on the missing packet information.

24 Claims, 11 Drawing Sheets

FIG. 10

MULTIPLE MULTICAST NETWORK SYSTEM AND METHOD FOR ENSURING RELIABILITY

CROSS-REFERENCE TO RELATED APPLICATIONS

This application claims the benefit under 35 USC §119(a) of Korean Patent Application No. 10-2014-0015719, filed on Feb. 11, 2014, in the Korean Intellectual Property Office, the entire disclosure of which is incorporated herein by reference for all purposes.

BACKGROUND

1. Field

The following description relates to multiple multicast technology. The following description also relates to a multiple multicast network system and method for ensuring transmission efficiency and transmission reliability in such a network.

2. Description of Related Art

Multicast refers to a scheme of simultaneously transmitting the same information in the form of image data, audio data, and related media data to at least two different receivers. For example, multicast may be used to distribute information from a sender to receivers for applications such as a video conference and an e-mail in the Internet, Multicast differs from unicast in that unicast is used to transmit a data packet only to a single predetermined receiver.

In the unicast, a data packet is repeatedly transmitted the same number of times as a number of receivers. The repeated transmission may lead to a reduction in an efficiency of a communication network. For example, the repeated transmission may cause a large transmission-related burden on a transmitter. However, an interactive Internet function, for example a video conference that occurs in real-time between multiple participants, may require real-time transmission of image and audio data from a sender. Accordingly, a multicast scheme for enabling data to be simultaneously exchanged among a plurality of users facilitates such communication.

In an example in which information is to be transmitted to 80 destination terminals from among 100 potential destination terminals, when a unicast scheme is used, the information is transmitted 80 times, once for each receiver. In this example, when a broadcast scheme is used and the information is transmitted to all potential receivers, and the information may be transferred to unnecessary 20 terminals. However, when a multicast scheme is used, the information may be transmitted to only the relevant 80 terminals.

Hence, unicast and broadcast schemes may result in certain inefficiencies when sharing information between parties across the Internet, including in real-time communications situations.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one aspect, a terminal includes a primary transmission processing unit configured to generate a primary network-coded packet by performing network coding on data of the terminal, and to transmit the primary network-coded packet to the other terminals in a group, a feedback processing unit configured to transmit missing packet information of missing packets of the terminal to the other terminals in the group, and to receive missing packet information from terminals having missing packets in the group, wherein the missing packets are packets that the terminal fails to receive from the other terminals in the group, and a retransmission processing unit configured to transmit a secondary network-coded packet to the other terminals in the group by performing network coding based on a successfully received packet and the data of the terminal, in response to the terminal being a retransmission terminal, and based on the missing packet information.

A grouping unit may transmit a multicast request message to terminals that the grouping unit groups, and in response to receiving a multicast response message from a terminal that receives the multicast request message, the grouping unit may group the terminal and the terminal that transmits the multicast response message in a group, assign group identification information to the group, and transmit the group identification information to the terminals in the group.

In response to receiving a multicast request message from a terminal having data to be transmitted, a grouping unit may generate a multicast response message, transmit the multicast response message to the terminal that transmits the multicast request message, and receive group identification information from the terminal that transmits the multicast request message.

In response to receiving a network-coded packet from another terminal in the group, the primary transmission processing unit may perform network coding based on the data of the terminal and the successfully received packet using a network coding unit, and generate the primary network-coded packet.

The missing packet information may indicate a total number of missing packets that the terminal fails to receive from the other terminals in the group.

In response to verifying a terminal having a number of missing packets that is greater than a number of the missing packets in the terminal exists in the group, before the missing packet information in the terminal is transmitted, the feedback processing unit may not transmit the missing packet information in the terminal.

The retransmission processing unit may transmit a number of secondary network-coded packets equal to a number of missing packets in a terminal that has a greatest number of missing packets among the terminals in the group.

The retransmission processing unit may transmit a number of secondary network-coded packets determined by the equation, S=<M/N>, wherein S denotes a number of secondary network-coded packets to be retransmitted by the terminal, M denotes a number of missing packets in the terminal having the greatest number of missing packets among the terminals in the group, N denotes a number of terminals in the group, and <x> denotes a smallest integer not less than or equal to x.

The terminal may further include a network decoding unit configured to decode a secondary network-coded packet received from the other terminals in the group, and to recover the missing packets from the secondary network-coded packet.

In another general aspect, a method in a terminal includes generating a primary network-coded packet by performing network coding on data of the terminal, transmitting the primary network-coded packet to other terminals in a group, transmitting missing packet information on missing packets in the terminal to the other terminals in the group, and receiving missing packet information from terminals having missing packets in the group, wherein the missing packets are packets that the terminal fails to receive from the other terminals in the group, and generating a secondary network-coded packet by performing network coding based on a successfully received packet and the data of the terminal, and transmitting the secondary network-coded packet to the other terminals in the group, in response to the terminal being a retransmission terminal, and based on the missing packet information.

The method may further include transmitting a multicast request message to terminals that the terminal groups, receiving a multicast response message from a terminal that receives the multicast request message, grouping the terminal and the terminal that transmits the multicast response message in a group, and assigning group identification information to the group, and transmitting the group identification information to the terminals in the group.

The grouping may include receiving a multicast request message, determining whether data to be transmitted to a terminal that transmits the multicast request message exists, generating a multicast response message, and transmitting the multicast response message to the terminal that transmits the multicast request message, in response to the data existing, and receiving group identification information from the terminal that transmits the multicast request message.

The generating of the primary network-coded packet may include, in response to a network-coded packet being received from another terminal in the group, performing network coding based on the data of the terminal and the successfully received packet, and generating the primary network-coded packet.

The missing packet information may indicate a total number of missing packets that the terminal fails to receive from the other terminals in the group.

The generating of the secondary network-coded packet may include transmitting a number of secondary network-coded packets equal to a number of missing packets in a terminal that has a greatest number of missing packets among the terminals in the group.

In another aspect, a method in a network system includes generating, by each of the terminals in a group, a primary network-coded packet by performing network coding on data of each of the terminals in the group, and transmitting the primary network-coded packet to the other terminals in the group, providing, as feedback, missing packet information on missing packets, wherein the missing packets are packets that the terminal fails to receive from the other terminals in the group, and generating, by a terminal in the group, a secondary network-coded packet by performing network coding based on a successfully received packet, data of the terminal, and the missing packet information, and transmitting the secondary network-coded packet to the other terminals in the group.

The method may further include transmitting, by the terminal, a multicast request message to terminals that the terminal groups, generating, by a terminal having data to be transmitted to a terminal that transmits the multicast request message, among terminals that receive the multicast request message, a multicast response message, and transmitting the multicast response message to the terminal that transmits the multicast request message, grouping the terminal that transmits the multicast response message and the terminal that transmits the multicast request message in a group, and assigning group identification information to the group, and transmitting the group identification information to the terminals in the group.

The generating of the primary network-coded packet may include, in response to receiving a network-coded packet from another terminal in the group, performing network coding based on data of the terminals and the successfully received packet, and generating the primary network-coded packet.

The providing may include transmitting, by terminals having missing packets in the group, a number of missing packets in the terminals to other terminals in the group.

The generating of the secondary network-coded packet may include transmitting, by a terminal in the group, a number of secondary network-coded packets equal to a number of missing packets in a terminal having a greatest number of missing packets among the terminals in the group, or dividing and transmitting, by terminals among the terminals in the group, a number of secondary network-coded packets equal to the number of the missing packets in the terminal having the greatest number of missing packets among the terminals.

In another general aspect, a terminal of a network system includes a primary transmission processing unit configured to generate a primary network-coded packet by performing network coding on data of the terminal, and to transmit the primary network-coded packet to other terminals in a group, and a retransmission processing unit configured to transmit a secondary network-coded packet to the other terminals in the group by performing network coding based on a successfully received packet and the data of the terminal, in response to the terminal being a retransmission terminal, and based on missing packet information, wherein terminals in the group share missing packet information with each other, the missing packets being packets that the terminals fail to receive from the other terminals in the group.

The primary transmission processing unit may transmit a multicast request message to terminals that the primary transmission processing unit groups, and wherein in response to receiving a multicast response message from a terminal that receives the multicast request message, the primary processing unit may group the terminal and the terminal that transmits the multicast response message in the group, assign group identification information to the group, and transmit the group identification information to the terminals in the group.

The retransmission processing unit may transmit a number of secondary network-coded packets equal to a number of missing packets in a terminal having a greatest number of missing packets among the terminals in the group.

The retransmission processing unit may transmit a number of secondary network-coded packets determined by the equation, $S=\langle M/N \rangle$, wherein S denotes a number of secondary network-coded packets to be retransmitted by the terminal, M denotes a number of missing packets in the terminal having the greatest number of missing packets among the terminals in the group, N denotes a number of terminals in the group, and $\langle x \rangle$ denotes a smallest integer not less than or equal to x.

The terminal may further include a network decoding unit configured to decode a secondary network-coded packet received from the other terminals in the group, and to recover the missing packets from the secondary network-coded packet.

Other features and aspects will be apparent from the following detailed description, the drawings, and the claims.

BRIEF DESCRIPTION OF THE DRAWINGS

FIG. 10 is a diagram illustrating an example of multicast performed using a half-duplex transmission scheme in a multiple multicast network system.

Figure 1:
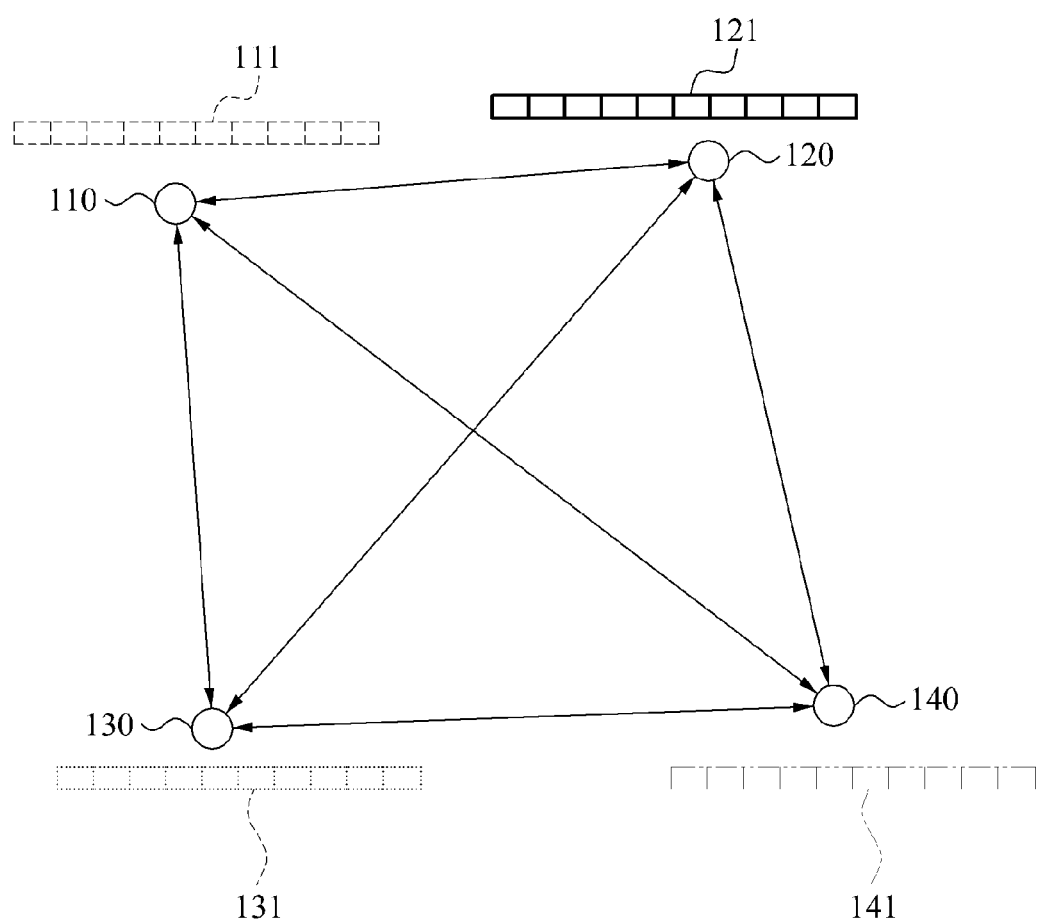
FIG. 1 is a diagram illustrating an example environment for a multiple multicast network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

In examples, using a multicast scheme prevents network resources from being wasted due to repeating of data transmission. Using a multicast scheme also efficiently ensures a real-time communications session without burdening a network by sending information to a network destination that does not require the corresponding network information.

FIG. 1 illustrates an example environment for a multiple multicast network.

Referring to the example of FIG. 1, the environment of the multiple multicast network system indicates a multi-source multicast environment in which terminals, for example terminals 110, 120, 130 and 140, transmit the same information to communication groups that are set for each of the terminals. For example, FIG. 1 illustrates an environment in which packets 111, 121, 131 and 141 are to be transmitted by the terminals 110 to 140, respectively. In FIG. 1, a transmitter of each of the terminals 110 to 140 transmits data to the same reception group, and such a transmission architecture is referred to as a "multiple multicast." For example, in the multiple multicast, the terminal 110 transmits the packet 111 to the terminals 120, 130 and 140, the terminal 120 transmits the packet 121 to the terminals 110, 130 and 140, the terminal 130 transmits the packet 131 to the terminals 110, 120 and 140, and the terminal 140 transmit the packet 141 to the terminals 110, 120 and 130. Thus, in this example multiple multicast environment, each of example terminals 110, 120, 130 and 140 transmit the packets 111, 121, 131 and 141 to all other terminals in the multicast environment.

An aspect of the multiple multicast is that destination sets in all transmitters are identical. Thus, a multiple multicast relates to a group of transmitters, all of which share information with all of the other members of that group.

Figure 2:
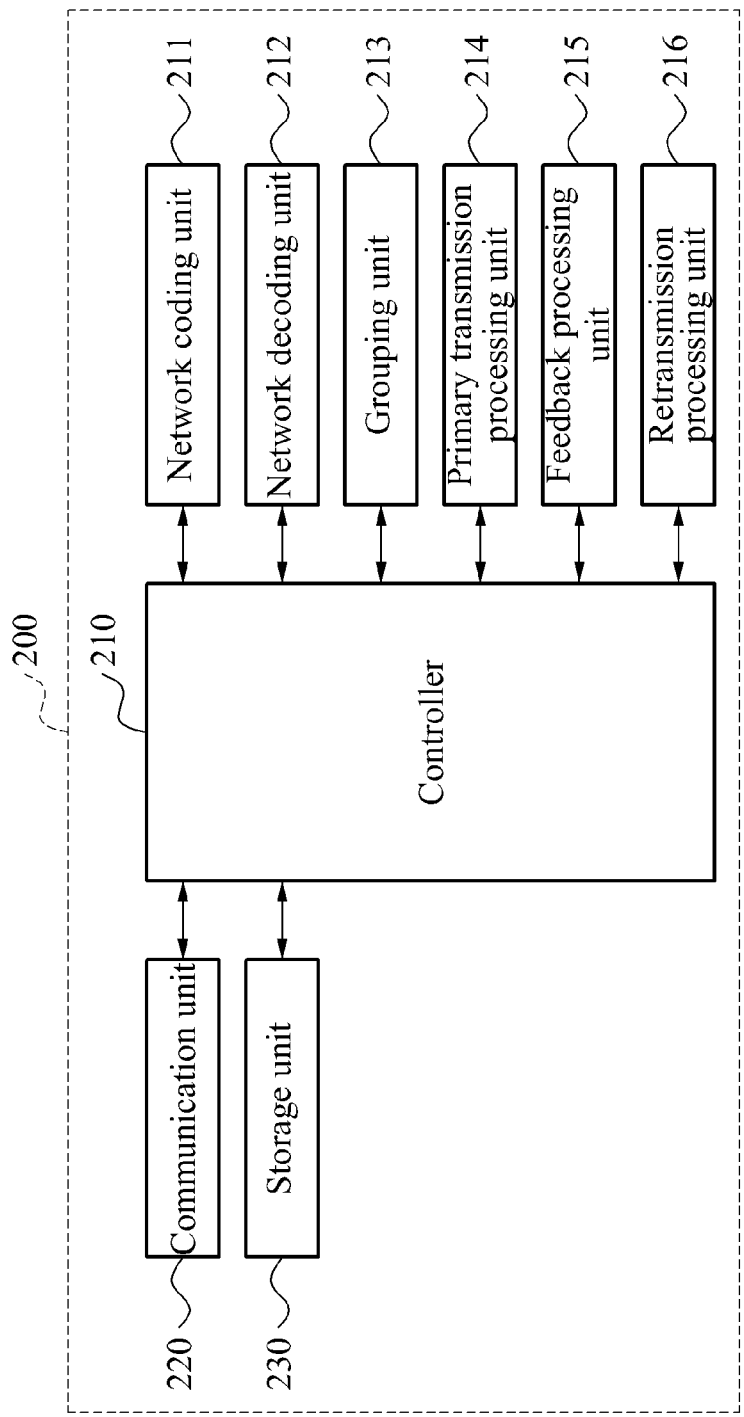
FIG. 2 is a diagram illustrating an example configuration for a terminal in a multiple multicast network system.

FIG. 2 illustrates an example configuration for a terminal 200 in a multiple multicast network system.

Referring to the example of FIG. 2, the terminal 200 includes a controller 210, a network coding unit 211, a network decoding unit 212, a grouping unit 213, a primary transmission processing unit 214, a feedback processing unit 215, a retransmission processing unit 216, a communication unit 220, and a storage unit 230. However, terminal 200 as presented in FIG. 2 may include other elements in addition to or instead of the elements included in the example of FIG. 2.

For example, the communication unit 220 is used as a communication interface device including a receiver and a transmitter. In an example, the communication unit 220 enables multicast communication. To this end, the communications unit 220 transmits and receives a multicast request message, a multicast response message, and a network coding packet. The multicast request message and the multicast response message are used, for example, to set a group.

To perform multicast communication, a network enabling multi-packet reception (MPR) is potentially used. In networking, MPR refers to the capability of networking nodes to decode/demodulate signals from a number of source nodes concurrently. A communication scheme with an MPR capability may include, for example, a code division multiple access (CDMA) scheme, an orthogonal frequency-division multiple access (OFDMA) scheme, a multiple-input and multiple-output (MIMO) scheme, a superposition coding scheme, a time sharing scheme, and the like. These schemes are various ways of producing, receiving, and interpreting signals that include multiple, different pieces of content that are received and processed simultaneously.

The storage unit 230 stores information, such as data, an application program, an operating system (OS) to control an overall operation of the terminal 200, and other information used to provide functionality and or data for the terminal 200. The data includes, for example, a telephone number, a message of a short message service (SMS), a compressed image file, a moving image, and the like. The data refers to the actual content that is shared between parties that engage in the multicast. In an example, the storage unit 230 stores data of the storage unit 230 that is to be multicast, and a network-coded packet received over multicast.

The network coding unit 211 generates a network-coded packet by performing network coding on data based on control of the primary transmission processing unit 214 and the retransmission processing unit 216. In an example, the network coding unit 211 performs network coding using a matrix network coding scheme.

The network decoding unit 212 performs network decoding on network-coded packets received from terminals other than the terminal 200 in a multicast group. Additionally, the network decoding unit 212 verifies successfully received packets and missing packets that the terminal 200 fails to receive from each of the other terminals. For example, when a missing packet is included in previously received network-coded packets, the missing packet is recovered based on a latest received network-coded packet.

In an example, the network coding refers to a technology of combining a plurality of packets and transmitting a combination of the packets to increase an efficiency of data communication. For example, when packets to be transmitted, for example "n" packets, are provided to a transmitter, the transmitter combines information of each of the packets, and transmits the packets. In this example, in a random linear network coding scheme, the information is combined using a scheme of multiplying a value of each of the packets by a random coefficient and adding the packets. Such a random coefficient is generated using appropriate techniques for producing random or pseudorandom values. Using the scheme, the transmitter transmits the packets with the information combined with the packets by multiplying by different coefficients each time. When a receiver receives the packets from the transmitter, packets with the original information are obtained by the receiver by multiplying a value of each of the received packets by an inverse matrix to an original coefficient matrix. Such an approach works because an inverse matrix in combination with the original coefficient matrix acts as an identity matrix, and hence the result of the processing at the receiver is the original coefficient matrix. In the random linear network coding, the receiver receives "n" packets among packets transmitted by the transmitter regardless of a type of packets and accordingly, an efficiency of retransmission increases because unnecessary and excessive transmission is minimized or avoided.

The grouping unit 213 may group terminals having data to be transmitted to each other in a single group.

Figure 7:
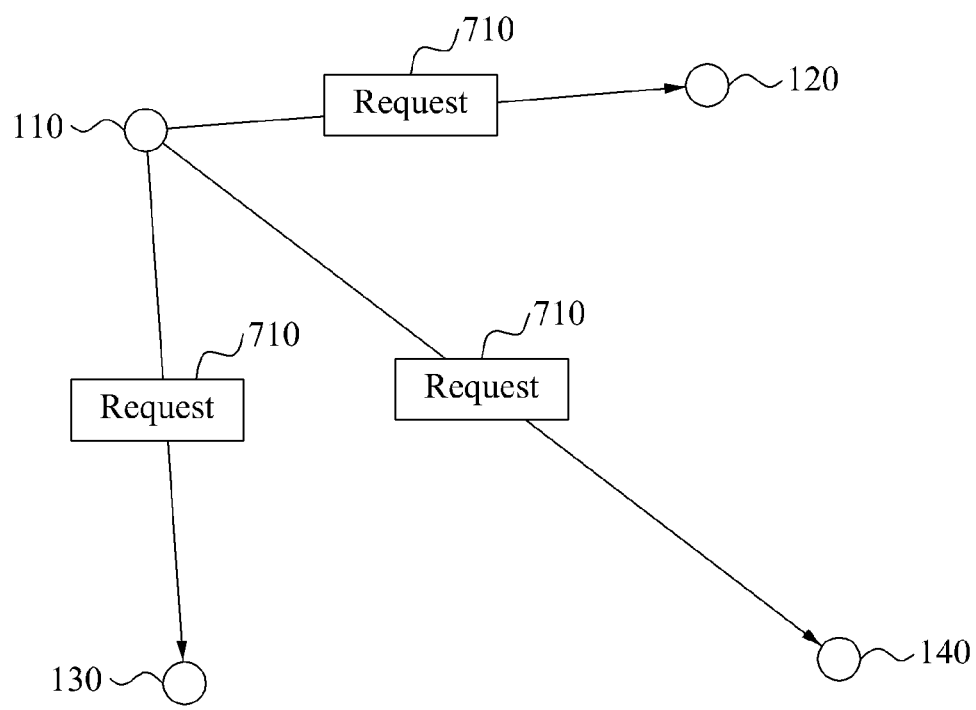
FIG. 7 is a diagram illustrating an example of transmitting a multicast request message, to perform grouping.
Figure 8:
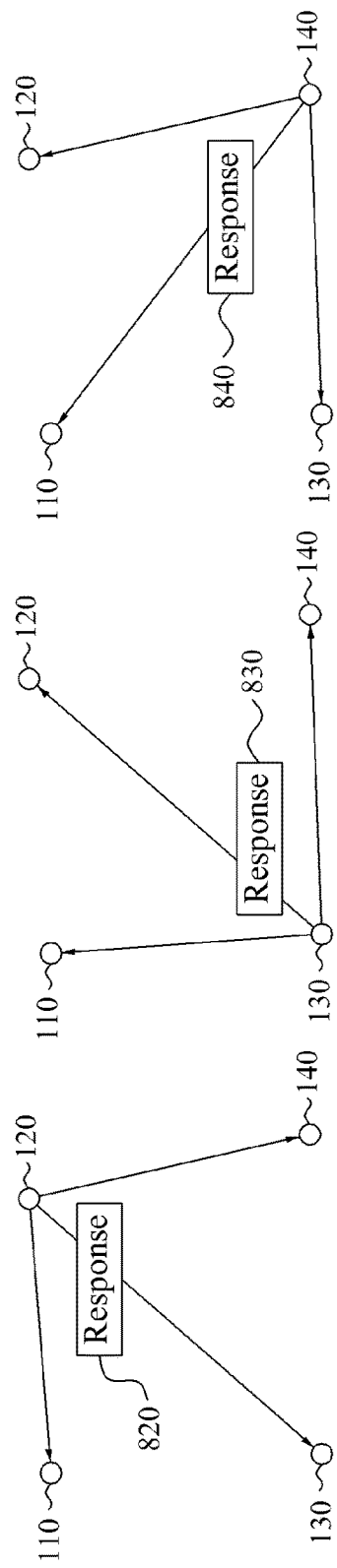
FIG. 8 is a diagram illustrating an example of transmitting a multicast response message, to perform grouping.
Figure 9:
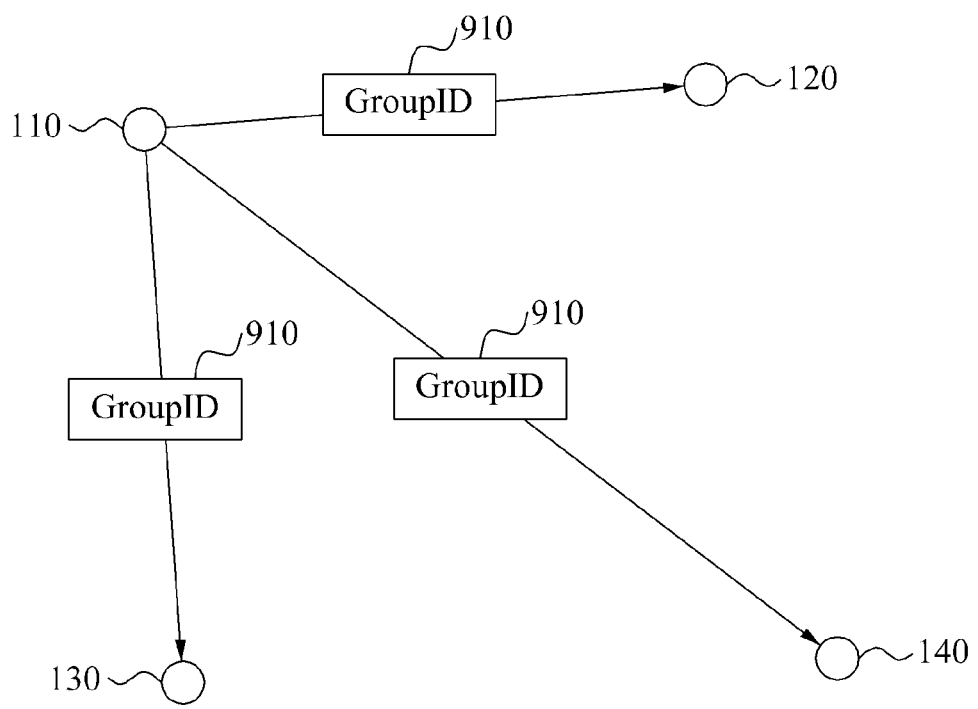
FIG. 9 is a diagram illustrating an example of transmitting group identification information, to perform grouping.

In an example, referring to FIGS. 7 through 9, when grouping is actively performed, a grouping unit of the terminal 110 transmits a multicast request message 710 to each of the terminals 120, 130, and 140 that the grouping unit 213 desires to group. Subsequently, multicast response messages 820, 830, and 840 are received from the terminals 120, 130, and 140 that receive the multicast request message 710, respectively. As a result the grouping unit 213 groups the terminal 110 together with the terminals 120, 130, and 140 in a single group, and assigns group identification information 910. The grouping unit 213 also transmits the group identification information 910 to the terminals 120, 130, and 140 in the group.

For example, when a multicast request message is received from a terminal that has data to be transmitted, the grouping unit 213 generates a multicast response message, transmits the multicast response message to the terminal that transmits the multicast request message, and receives group identification information from the terminal that transmits the multicast request message.

The grouping unit 213 transmits a multicast request message based on a synchronization (sync) message. For example, in a wireless local area network (WLAN), a sync message requesting multicast is replaced by a beacon signal, and group identification information, such as a group identifier (ID), is synchronized based on a timestamp of the beacon.

At least one of terminals among the terminals in a group periodically transmits a sync message, and sets synchronization of the group based on the sync message. The sync message includes, for example, group identification information.

For example, the primary transmission processing unit 214 generates a primary network-coded packet by performing network coding on data of the terminal 200 using the network coding unit 211. The primary transmission processing unit 214 then transmits the primary network-coded packet to the other terminals in the group.

For example, when a network-coded packet is received from another terminal in the group, the primary transmission processing unit 214 performs network coding based on the data of the terminal 200 and a successfully received packet, using the network coding unit 211, and generates a primary network-coded packet.

When the terminal 200 has missing packets that the terminal 200 fails to receive from the other terminals in the group, the feedback processing unit 215 transmits missing packet information on the missing packets to the other terminals. In response, the terminal receives missing packet information from terminals having missing packets in the group. In an example, the missing packet information includes a total number of missing packets that the terminal 200 fails to receive from each of the other terminals in the group, and/or identification information used to identify missing packets.

In an example, before transmitting the missing packet information in the terminal 200, the feedback processing unit 215 verifies the missing packet information received from the terminals having the missing packets in the group. When a result of the verifying indicates that a terminal that has a number of missing packets that is greater than a number of the missing packets in the terminal 200 exists in the group, and when the missing packet information in the terminal 200 is not yet transmitted, the feedback processing unit 215 does not transmit the missing packet information in the terminal 200.

The feedback processing unit 215 provides, as feedback, missing packet information indicating a number of missing packets. The number of missing packets is a total number of packets that the terminal 200 fails to receive, based on a length of a negative acknowledgement (NACK) message. The NACK message has a length obtained by multiplying the number of the missing packets by a reference length corresponding to a single missing packet is generated, and is potentially fed back. For example, when a reference length of a NACK message is set to 1 byte, and when three missing packets exist, the feedback processing unit 215 generates a NACK message with a length of 3 bytes The feedback processing unit 215 provides as feedback the NACK message, to notify that the three missing packets are generated.

When the terminal 200 is determined to be a retransmission terminal, the retransmission processing unit 216 transmits a secondary network-coded packet to the other terminals in the group by performing network coding based on the data of the terminal 200 and a successfully received packet using the network coding unit 211.

For example, the retransmission processing unit 216 transmits the same number of secondary network-coded packets as the greatest number of missing packets included in a terminal among the terminals in the group.

In examples, a predetermined terminal in a group is selected as a retransmission terminal. However there is no limitation thereto, and other examples select different predetermined terminals as a retransmission terminal based on various criteria. For example, a terminal having a smallest number of missing packets in the group is selected as a retransmission terminal, or all the terminals in the group participate in retransmission. By changing the criteria for retransmission, it is possible to adapt the way in which retransmission occurs in order to improve efficiency.

When all the terminals in the group are determined to be retransmission terminals, the retransmission processing unit 216 transmits the same number of secondary network-coded packets as a number of packets. In an example, the number of packets is determined by Equation 1.

$$S = \langle M/N \rangle \qquad \text{Equation 1}$$

In Equation 1, S denotes a number of secondary network-coded packets that need to be retransmitted by a corresponding terminal. M denotes a number of missing packets of a terminal having a largest number of missing packets among terminals in a group. N denotes a number of terminals included in a group. $\langle x \rangle$ denotes a smallest integer not less than or equal to x.

Figure 10:
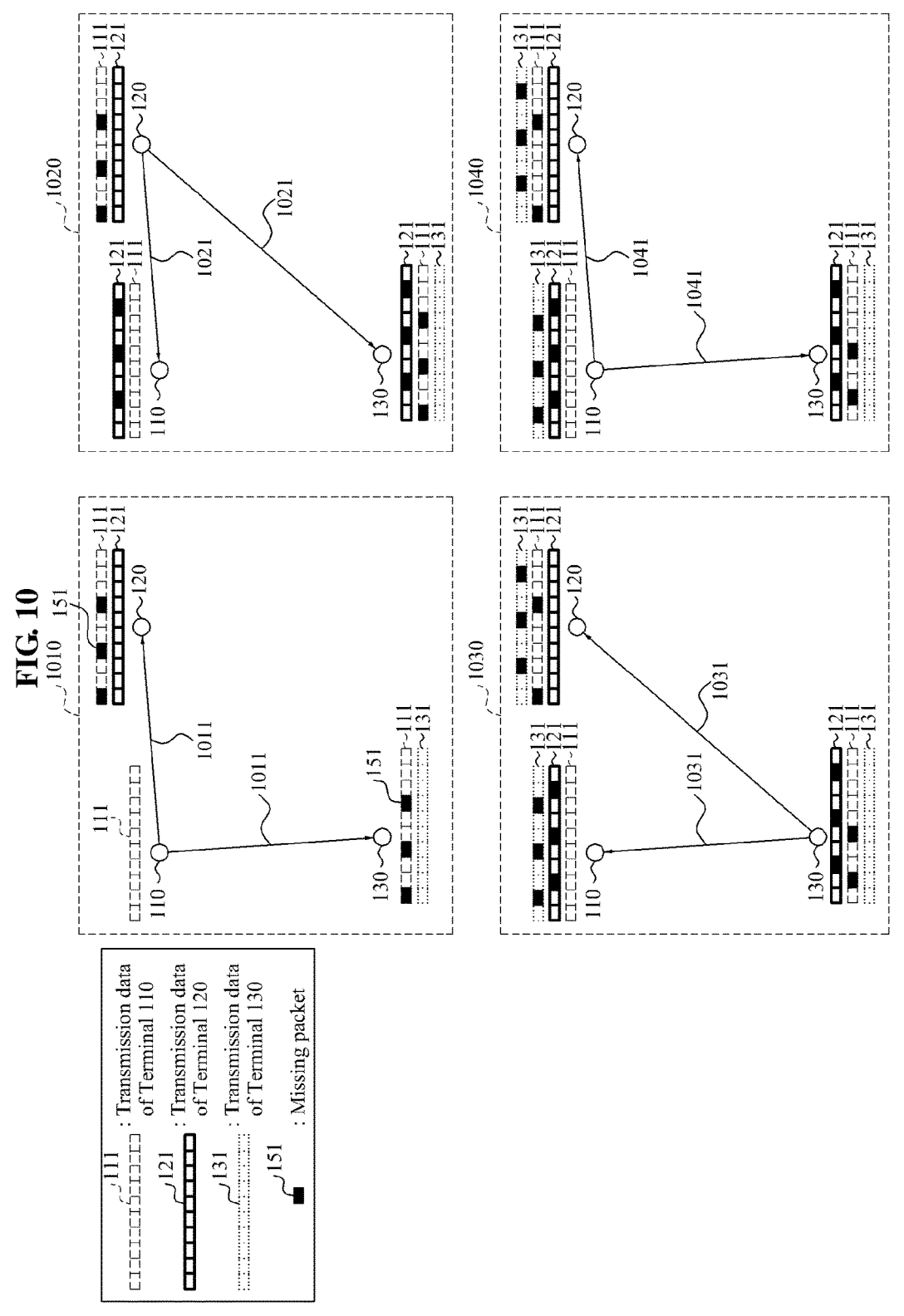
Figure 11:
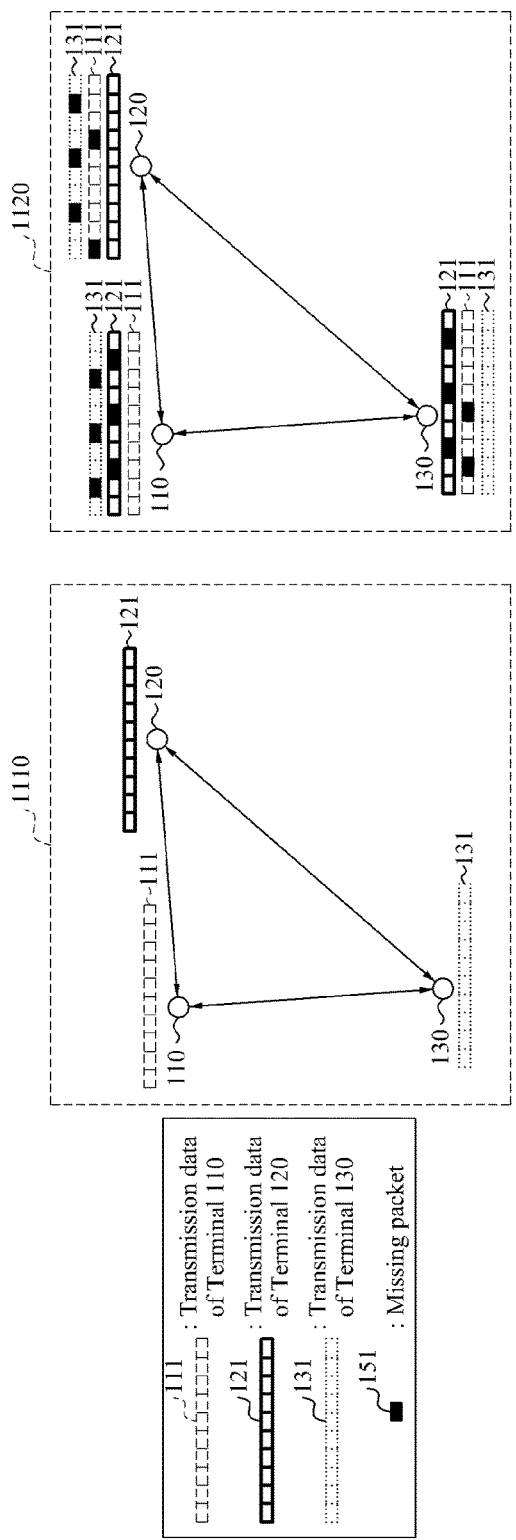
FIG. 11 is a diagram illustrating an example of multicast performed using a full-duplex transmission scheme in a multiple multicast network system.

The primary transmission processing unit 214, and the retransmission processing unit 216 operate based on a type of communication schemes as illustrated by examples in FIGS. 10 and 11.

FIG. 10 illustrates an example of multicast performed using a half-duplex transmission scheme in a multiple multicast network system.

Referring to the example of FIG. 10, when a half-duplex transmission scheme is performed in a multiple multicast network system, transmission is primarily performed through operations 1010, 1020, and 1030. In this example, retransmission is performed by operation 1040 to recover missing packets 151. The half-duplex transmission scheme enables either transmission or reception to be performed at a particular time. However, a half-duplex transmission scheme is not designed to allow transmission and reception to occur simultaneously.

In operation 1010, the terminal 110 performs network coding on data 111 of the terminal 110. The terminal performs this operation because previously received data does not exist. After performing the coding, the terminal 110 transmits network-coded packets 1011 to the terminals 120 and 130 in a group.

Thus, when the data 111 is received from the terminal 110, the terminal 120 performs network coding based on successfully received packets in the data 111 and data 121 of the terminal 120. After the coding, the terminal 120 transmits network-coded packets 1021 to the terminals 110 and 130 in the group in operation 1020.

When the data 111 and 121 are received from the terminals 110 and 120, respectively, the terminal 130 performs network coding based on successfully received packets in data 131 of the terminal 130 and the data 111 and 121, and transmits network-coded packets 1031 to the terminals 110 and 120 in the group in operation 1030.

To recover missing packets 151 in the group, in operation 1040, the terminal 110 performs network coding based on successfully received packets in the data 111 and the received data 121 and 131. After the network coding, the terminal 110 generates secondary network-coded packets 1041. The terminal 110 then transmits the same number of secondary network-coded packets as a number of missing packets that did not arrive at the terminal 120 to the terminals 120 and 130. In an example, the terminal 120 has a largest number of missing packets in the group.

FIG. 11 illustrates an example of multicast performed using a full-duplex transmission scheme in a multiple multicast network system.

Referring to FIG. 11, when a full-duplex transmission scheme is performed in a multiple multicast network system, transmission may be primarily performed through operation 1110, and retransmission may be performed through operation 1120 to recover missing packets 151. The full-duplex transmission scheme enables both transmission and reception to be performed at once.

In operation 1110, all the terminals 110, 120, and 130 in the group perform network coding on data 111, 121, and 131 of the terminals 110, 120, and 130, respectively. The terminals 110, 120, and 130 simultaneously transmit and receive primary network-coded packets. As a result, terminals 110, 120, and 130 do not switch between transmission and reception as is a part of the half-duplex transmission scheme of FIG. 10.

To recover missing packets 151 in the group, in operation 1120, each of the terminals 110, 120, and 130 performs network coding based on each of the data 111, 121, and 131 and a data packet that is successfully received from the other terminals in the group. Subsequently, each of the terminals 110, 120, and 130 generates secondary network-coded packets, and transmits the secondary network-coded packets to the other terminals.

In an example, in operation 1120, all the generated secondary network-coded packets are transmitted. Alternatively, each of the terminals 110, 120, and 130 transmits the same number of secondary network-coded packets as a greatest number of missing packets in a terminal in the group. Additionally, the same number of secondary network-coded packets as a number of packets is determined by Equation 1 as described above.

Additionally, with respect to the example of FIG. 2, the controller 210 controls an overall operation of the terminal 200. Additionally, the controller 210 performs operations corresponding to the network coding unit 211, the network decoding unit 212, the grouping unit 213, the primary transmission processing unit 214, the feedback processing unit 215, and the retransmission processing unit 216. While in examples, these functions are integrated into the controller 210, to more clearly disclose the operation of the terminal 200, the network coding unit 211, the network decoding unit 212, the grouping unit 213, the primary transmission processing unit 214, the feedback processing unit 215, and the retransmission processing unit 216, are illustrated separately illustrated in FIG. 2.

In an example, the controller 210 includes at least one processor configured to perform an operation corresponding to each of the network coding unit 211, the network decoding unit 212, the grouping unit 213, the primary transmission processing unit 214, the feedback processing unit 215, and the retransmission processing unit 216. In another example, the controller 210 includes at least one processor configured to partially perform a function of each of the network coding unit 211, the network decoding unit 212, the grouping unit 213, the primary transmission processing unit 214, the feedback processing unit 215, and the retransmission processing unit 216. Thus, the terminal 200 includes a controller 210, and various architectures of the controller 210 are possible that allow it to provide the functionality of the elements discussed above.

The terminal 200 of FIG. 2 determines a number of network-coded packets that are to be retransmitted, based on feedback information. However, as an alternative, all terminals in a group retransmit all secondary network-coded packets repeatedly a predetermined number of times. By such retransmitting, accordingly, a feedback processing unit is not required.

For example, the predetermined number of times is potentially determined based on information such as a rate of matrix network coding, a communication state, and a number of terminals included in a group. For example, when the rate of matrix network coding increases, when the communication state becomes worse, or when the number of terminals in the group increases, the predetermined number of times is increased. Various heuristics and techniques are potentially used to determine the predetermined number of times.

Figure 3:
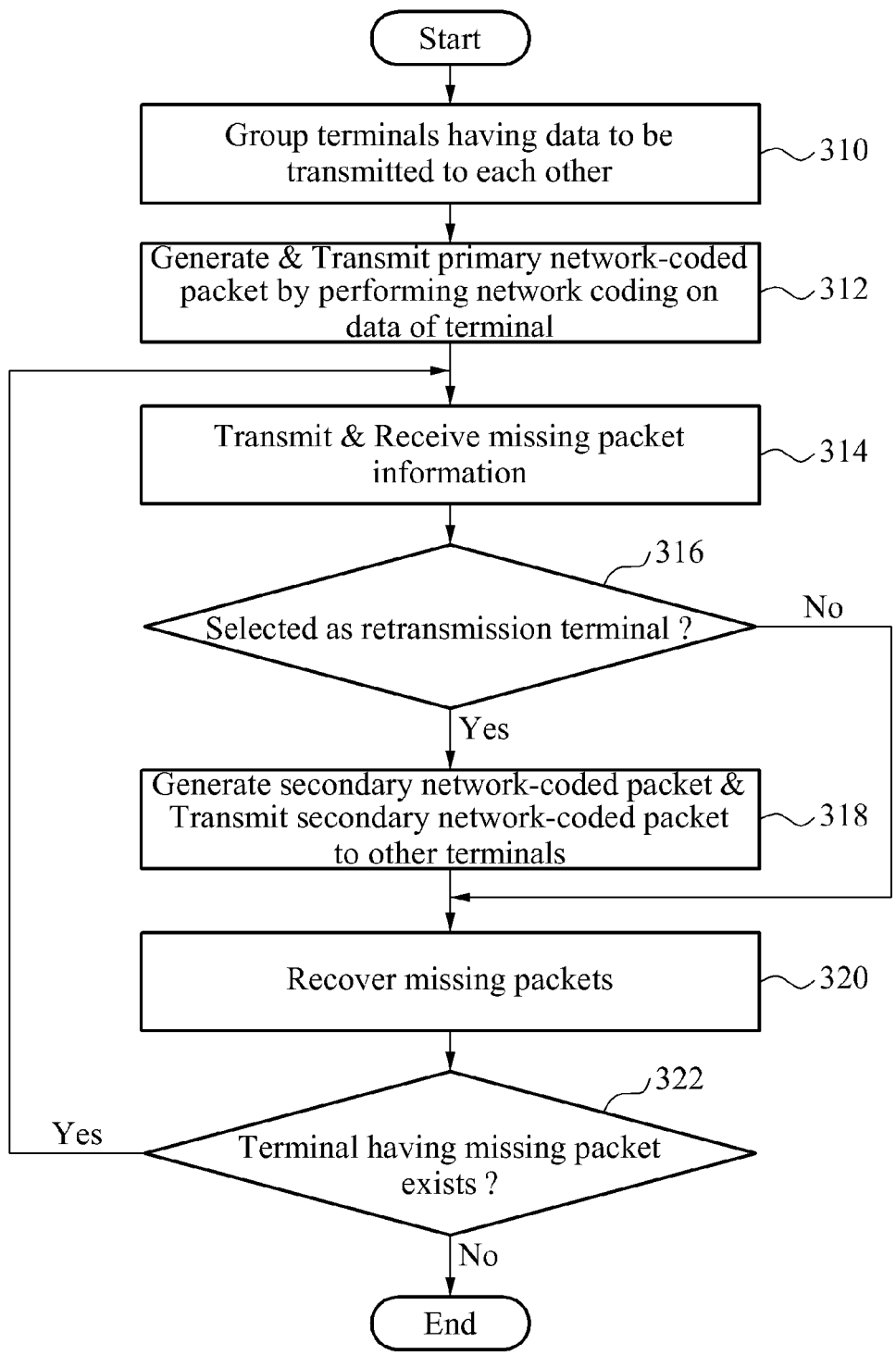
FIG. 3 is a flowchart illustrating an example multicast process with a high transmission efficiency and high transmission reliability in a terminal of a multiple multicast network system.

FIG. 3 illustrates an example of a multicast process with a high transmission efficiency and high transmission reliability in a terminal of a multiple multicast network system.

Referring to FIG. 3, in operation 310, the method groups terminals having data to be transmitted to each other in a single group. For example, the terminal 200 of FIG. 2 groups terminals having data to be transmitted to each other in a single group.

In operation 312, the method generates a primary network-coded packet by performing network coding on data of the terminal 200, and transmits the generated primary network-coded packet to the other terminals in the group. For example, terminal 200 generates a primary network-coded packet by performing network coding on data of the terminal 200, and transmits the generated primary network-coded packet to the other terminals in the group.

For example, when a network-coded packet is received from another terminal in the group, the terminal 200 performs network coding based on the data of the terminal 200 and a successfully received packet, that is, the received network-coded packet, and generate a primary network-coded packet in operation 312.

In operation 314, the method transmits and receives missing packet information. For example, when the terminal 200 has missing packets that the terminal 200 fails to receive from the other terminals in the group, the terminal 200 transmits missing packet information on the missing packets to the other terminals. The terminal 200 also receives missing packet information from terminals having missing packets in the group. The missing packet information may indicate a total number of missing packets that the terminal 200 fails to receive from each of the other terminals in the group.

In operation 316, the method determines whether the terminal 200 is selected as a retransmission terminal configured to perform retransmission to recover a missing packet. The terminal 200 determines whether the terminal 200 is selected as a retransmission terminal configured to perform retransmission to recover a missing packet.

In an example in which the terminal 200 is selected as a retransmission terminal in operation 316, the method generates a secondary network-coded packet by performing network coding based on the data of the terminal 200 and all successfully received packets, and transmits the generated secondary network-coded packet to the other terminals in the group. For example, terminal 200 generates a secondary network-coded packet by performing network coding based on the data of the terminal 200 and all successfully received packets, and transmits the generated secondary network-coded packet to the other terminals in the group.

For example, in operation 318, the terminal 200 transmits the same number of secondary network-coded packets as a greatest number of missing packets included in a terminal among the terminals in the group, or as a number of packets determined by Equation 1, as described above.

In operation 320, the method recovers missing packets by decoding a secondary network-coded packet received from each of the other terminals. For example, the terminal 200 recovers missing packets by decoding a secondary network-coded packet received from each of the other terminals.

In operation 322, when a terminal having a missing packet is determined to still exist in the group in operation 322 after operation 320, the method repeatedly performs operations 314 to 322 until a missing packet does not exist. For example, terminal 200 repeatedly performs operations 314 to 322 until a missing packet does not exist.

Figure 4:
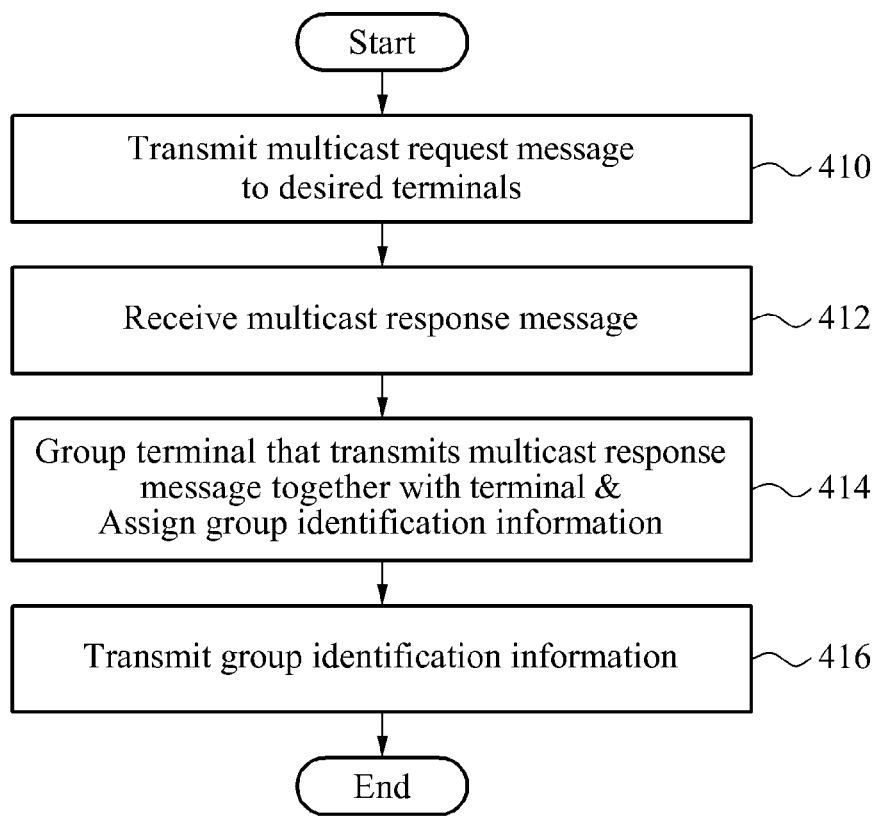
FIG. 4 is a flowchart illustrating an example of grouping led by a terminal in a multiple multicast network system.

FIG. 4 illustrates an example of grouping led by a terminal in a multiple multicast network system.

Referring to FIG. 4, in operation 410, the method the terminal 200 transmits a multicast request message to desired terminals that the terminal 200 desires to group. For example, the terminal 200 transmits a multicast request message to desired terminals that the terminal 200 desires to group.

In operation 412, the method receives a multicast response message from a terminal that has data to be transmitted to the terminal 200, among the terminals that receive the multicast request message. For example, the terminal 200 receives a multicast response message from a terminal that has data to be transmitted to the terminal 200, among the terminals that receive the multicast request message.

In operation 414, the method groups the terminal that transmits the multicast response message together with the terminal 200 in a group, and assigns group identification information to the group. For example, the terminal 200 groups the terminal that transmits the multicast response message together with the terminal 200 in a group, and assigns group identification information to the group.

In operation 416, the method transmits the group identification information to the terminals in the group. For example, the terminal 200 transmits the group identification information to the terminals in the group.

Figure 5:
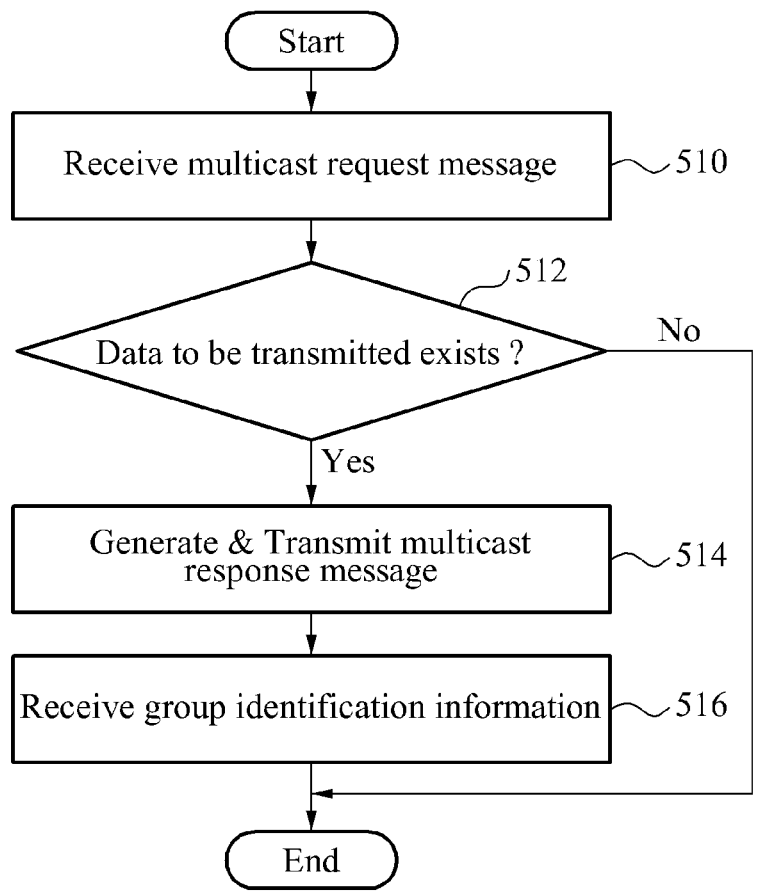
FIG. 5 is a flowchart illustrating an example of grouping performed based on a request by a terminal in a multiple multicast network system.

FIG. 5 illustrates an example of grouping performed based on a request by a terminal in a multiple multicast network system.

Referring to FIG. 5, in operation 510, the method receives a multicast request message. For example, the terminal 200 of FIG. 2 receives a multicast request message. In operation 512, the method determines whether data to be transmitted to a terminal that transmits the multicast request message exists. For example, the terminal 200 of FIG. 2 determines whether data to be transmitted to a terminal that transmits the multicast request message exists.

In an example in which the data is determined to exist in operation 512, the method generates a multicast response message, and transmits the multicast response message to the terminal in operation 514. For example, the terminal 200 generates a multicast response message, and transmits the multicast response message to the terminal.

In operation 516, the method receives group identification information from the terminal. For example, the terminal 200 receives group identification information from the terminal.

In the example of FIG. 5, the terminal 200 transmits the multicast response message, when the data to be transmitted to the terminal that transmits the multicast request message exists. However, examples are not limited to such an approach. Accordingly, in another example, when the data does not exist, the terminal 200 transmits a multicast response message providing notice that the data does not exist.

Figure 6:
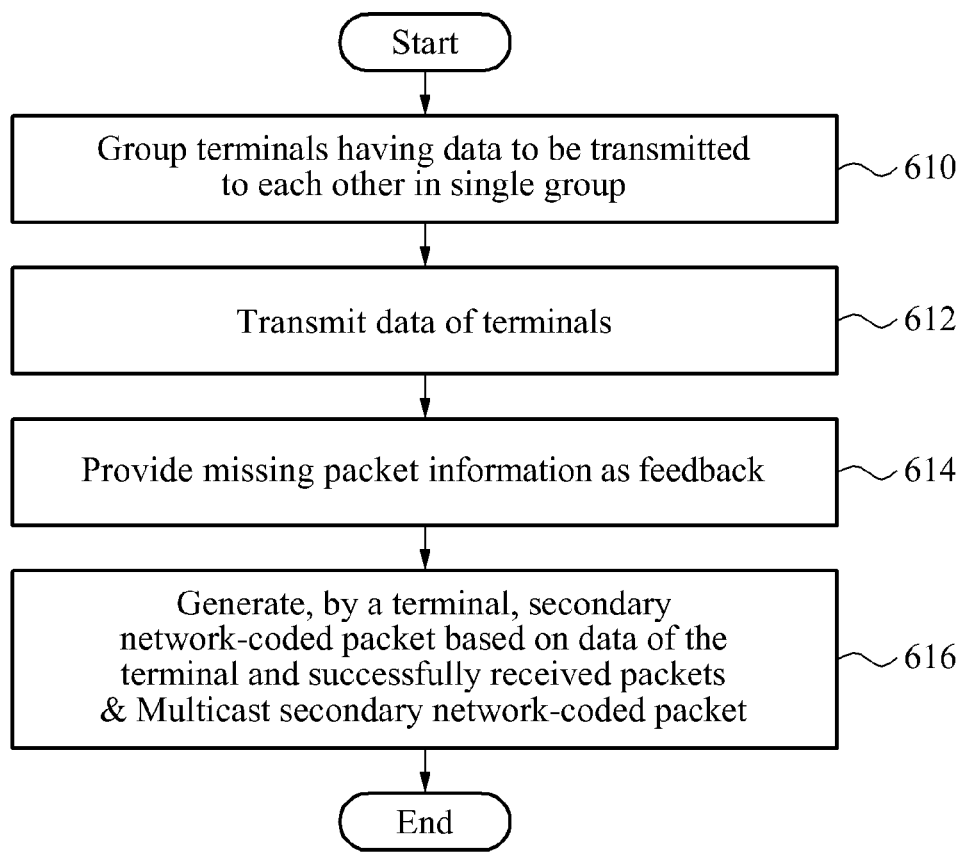
FIG. 6 is a flowchart illustrating another example multicast process with a high transmission efficiency and high transmission reliability in a terminal of a multiple multicast network system.

FIG. 6 illustrates another example of a multicast process with a high transmission efficiency and high transmission reliability in a terminal of a multiple multicast network system.

Referring to FIG. 6, in operation 610, the method groups terminals having data to be transmitted to each other in a single group. For example, the multiple multicast network system groups terminals having data to be transmitted to each other in a single group.

In operation 610, at least one terminal transmits a multicast request message to terminals that the at least one terminal groups. A terminal that has data to be transmitted to a terminal that transmits the multicast request message, among the terminals that receive the multicast request message, generates a multicast response message, and transmits the multicast response message to the terminal that transmits the multicast request message. In an example, the terminal that transmits the multicast response message and the terminal that transmits the multicast request message are combined in a single group. Furthermore, in an example, group identification information is optionally assigned to the group. In such an example, the group identification information is potentially transmitted to the terminals in the group.

In operation 612, the method generates a primary network-coded packet by performing network coding on data of each of the terminals in the group, and transmits the primary network-coded packet to the other terminals in the group. For example, each of the terminals in the group generates a primary network-coded packet by performing network coding on data of each of the terminals in the group, and transmits the primary network-coded packet to the other terminals in the group.

For example, when a network-coded packet is received from another terminal in the group, each of the terminals in the group performs network coding based on data of each of the terminals and a successfully received packet, that is, the received network-coded packet. Then, each of the terminals in the group generates a primary network-coded packet.

When a terminal that has a missing packet that the terminal fails to receive exists in the group, the method provides as feedback missing packet information on the missing packet to the other terminals in operation 614. For example, the multiple multicast network system provides as feedback missing packet information on the missing packet to the other terminals. In such an example, in operation 614, a number of missing packets in each of terminals having the missing packets is transmitted to the other terminals in the group.

In operation 616, the method generates a secondary network-coded packet by performing network coding based on data of the at least one and successfully received packets, and transmits the secondary network-coded packet to the other terminals in the group. For example, at least one terminal among the terminals in the group generates a secondary network-coded packet by performing network coding based on data of the at least one terminal and successfully received packets, and transmits the secondary network-coded packet to the other terminals in the group.

In operation 616, in an example, a single terminal in the group transmits all the same number of secondary network-coded packets as a largest number of missing packets included in a terminal among the terminals in the group. In another example, at least two terminals from among the terminals in the group divide and transmit the same number of secondary network-coded packets as the largest number of missing packets included in the terminal.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a hardware component may include multiple processors or a processor and a controller. In addition, different processing configurations are possible, such as parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

As a non-exhaustive illustration only, a terminal/device/unit described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blu-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

A computing system or a computer may include a microprocessor that is electrically connected to a bus, a user interface, and a memory controller, and may further include a flash memory device. The flash memory device may store N-bit data via the memory controller. The N-bit data may be data that has been processed and/or is to be processed by the microprocessor, and N may be an integer equal to or greater than 1. If the computing system or computer is a mobile device, a battery may be provided to supply power to operate the computing system or computer. It will be apparent to one of ordinary skill in the art that the computing system or computer may further include an application chipset, a camera image processor, a mobile Dynamic Random Access Memory (DRAM), and any other device known to one of ordinary skill in the art to be included in a computing system or computer. The memory controller and the flash memory device may constitute a solid-state drive or disk (SSD) that uses a non-volatile memory to store data.

A terminal, which may be referred to as a computer terminal, may be an electronic or electromechanical hardware device that is used for entering data into and displaying data received from a host computer or a host computing system. A terminal may be limited to inputting and displaying data, or may also have the capability of processing data as well. A terminal with a significant local programmable data processing capability may be referred to as a smart terminal or fat client. A terminal that depends on the host computer or host computing system for its processing power may be referred to as a thin client. A personal computer can run software that emulates the function of a terminal, sometimes allowing concurrent use of local programs and access to a distant terminal host system.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A terminal, comprising:
   a primary transmission processor configured to:
      generate a primary network-coded packet by performing network coding on data of the terminal, and
      transmit the primary network-coded packet to other terminals in a group of terminals comprising the terminal;
   a feedback processor configured to:
      transmit, in response to a number of missing packets of the terminal being equal to or greater than a number of missing packets of another terminal in the group, missing packet information of the missing packets of the terminal to the other terminals in the group, and
      receive missing packet information from other terminals in the group having missing packets, wherein the missing packets are packets that the terminal fails to receive from the other terminals in the group; and
   a retransmission processor configured to transmit, based on the received missing packet information and in response to the terminal being a retransmission terminal, a secondary network-coded packet to the other terminals in the group by performing network coding based on a received packet and the data of the terminal,
   wherein the primary transmission processor is further configured to, in response to receiving a network-coded packet from the other terminal in the group, generate the primary network-coded packet based on the data of the terminal and the received packet.

2. The terminal of claim 1, further comprising:
   a grouper configured to transmit a multicast request message to terminals that the grouper groups, and
   wherein the grouper is further configured to, in response to receiving a multicast response message from a terminal that receives the multicast request message, group the terminal and the terminal that transmits the multicast response message in a group, assign group identification information to the group, and transmit the group identification information to the terminals in the group.

3. The terminal of claim 1, wherein a grouper is configured to, in response to receiving a multicast request message from a terminal having data to be transmitted, generate a multicast response message, transmit the multicast response message to the terminal that transmits the multicast request message, and receive group identification information from the terminal that transmits the multicast request message.

4. The terminal of claim 1, wherein the missing packet information indicates a total number of missing packets that the terminal fails to receive from the other terminals in the group.

5. The terminal of claim 1, wherein the feedback processor is further configured to, in response to verifying that a terminal having a number of missing packets that is greater than the number of the missing packets of the terminal exists in the group, before the missing packet information in the terminal is transmitted, cancel the transmitting of the missing packet information in the terminal.

6. The terminal of claim 1, wherein the retransmission processor is further configured to transmit a number of secondary network-coded packets equal to a number of missing packets in a terminal that has a greatest number of missing packets among the terminals in the group.

7. The terminal of claim 6, wherein the retransmission processor is further configured to transmit a number of secondary network-coded packets determined by the equation, $$S = <M/N>$$

wherein S denotes a number of secondary network-coded packets to be retransmitted by the terminal, M denotes a number of missing packets in the terminal having the greatest number of missing packets among the terminals in the group, and N denotes a number of terminals in the group.

8. The terminal of claim 1, further comprising:
a network decoder configured to decode a secondary network-coded packet received from the other terminals in the group, and to recover the missing packets from the secondary network-coded packet.

9. A method in a terminal, the method comprising:
generating a primary network-coded packet by performing network coding on data of the terminal;
transmitting the primary network-coded packet to other terminals in a group;
transmitting, in response to a number of missing packets in the terminal being equal to or greater than a number of missing packets in another terminal in the group, missing packet information on the missing packets in the terminal to the other terminals in the group;
receiving missing packet information from other terminals in the group having missing packets, wherein the missing packets are packets that the terminal fails to receive from the other terminals in the group;
generating a secondary network-coded packet by performing network coding based on a successfully received packet and the data of the terminal; and
transmitting the secondary network-coded packet to the other terminals in the group, in response to the terminal being a retransmission terminal, and based on received the missing packet information,
wherein the generating of the primary network-coded packet comprises, in response to a network-coded packet being received from another terminal in the group, generating the primary network-coded packet based on the data of the terminal and the received packet.

10. The method of claim 9, wherein the method further comprises:
transmitting a multicast request message to terminals that the terminal groups;
receiving a multicast response message from a terminal that receives the multicast request message;
grouping the terminal and the terminal that transmits the multicast response message in a group, and assigning group identification information to the group; and
transmitting the group identification information to the terminals in the group.

11. The method of claim 9, wherein the grouping comprises:
receiving a multicast request message;
determining whether data to be transmitted to a terminal that transmits the multicast request message exists;
generating a multicast response message, and transmitting the multicast response message to the terminal that transmits the multicast request message, in response to the data existing; and
receiving group identification information from the terminal that transmits the multicast request message.

12. The method of claim 9, wherein the missing packet information indicates a total number of missing packets that the terminal fails to receive from the other terminals in the group.

13. The method of claim 9, wherein the generating of the secondary network-coded packet comprises transmitting a number of secondary network-coded packets equal to a number of missing packets in a terminal that has a greatest number of missing packets among the terminals in the group.

14. A method in a network system, the method comprising:
generating, by each terminal in a group of terminals, a primary network-coded packet by performing network coding on data of each of the terminals in the group;
transmitting the primary network-coded packet to other terminals in the group;
providing, as feedback, missing packet information on missing packets, wherein the missing packets are packets that the terminal fails to receive from the other terminals in the group;
generating, by a terminal in the group, secondary network-coded packets by performing network coding based on a successfully received packet, data of the terminal, and the missing packet information; and
transmitting, by the terminal in the group, the secondary network-coded packets to the other terminals in the group,
wherein the generating of the primary network-coded packet comprises, in response to receiving a network-coded packet from another terminal in the group, generating the primary network-coded packet based on data of the terminals and the received packet, and
wherein a number of the secondary network-coded packets is determined based on a number of terminals in the group and on a number of missing packets in a terminal that has a greatest number of missing packets among the terminals in the group.

15. The method of claim 14, wherein the method further comprises:
transmitting, by the terminal, a multicast request message to terminals that the terminal groups;
generating, by a terminal having data to be transmitted to a terminal that transmits the multicast request message, among terminals that receive the multicast request message, a multicast response message, and transmitting the multicast response message to the terminal that transmits the multicast request message;
grouping the terminal that transmits the multicast response message and the terminal that transmits the multicast request message in a group, and assigning group identification information to the group; and
transmitting the group identification information to the terminals in the group.

16. The method of claim 14, wherein the providing comprises transmitting, by terminals having missing packets in the group, a number of missing packets in the terminals to other terminals in the group.

17. The method of claim 14, wherein the generating of the secondary network-coded packets comprises:

transmitting, by a terminal in the group, a number of secondary network-coded packets equal to a number of missing packets in a terminal having a greatest number of missing packets among the terminals in the group; or dividing and transmitting, by terminals among the terminals in the group, a number of secondary network-coded packets equal to the number of the missing packets in the terminal having the greatest number of missing packets among the terminals.

18. A terminal of a network system, the terminal comprising:

a primary transmission processor configured to generate a primary network-coded packet by performing network coding on data of the terminal, and to transmit the primary network-coded packet to other terminals in a group;

a retransmission processor configured to transmit, based on the missing packet information and in response to the terminal being a retransmission terminal, secondary network-coded packets to the other terminals in the group by performing network coding based on a successfully received packet and the data of the terminal wherein terminals in the group share missing packet information with each other, the missing packets being packets that the terminals fail to receive from the other terminals in the group; and wherein the primary transmission processor is further configured to, in response to receiving a network-coded packet from another terminal in the group, generate the primary network-coded packet based on the data of the terminal and the received packet, and wherein a number of the secondary network-coded packets is determined based on a number of terminals in the group and on a number of missing packets in a terminal that has a greatest number of missing packets among the terminals in the group.

19. The terminal of claim 18, wherein the primary transmission processor is further configured to transmit a multicast request message to terminals that the primary transmission processor groups, and wherein in response to receiving a multicast response message from a terminal that receives the multicast request message, the primary transmission processor groups the terminal and the terminal that transmits the multicast response message in the group, assigns group identification information to the group, and transmits the group identification information to the terminals in the group.

20. The terminal of claim 18, wherein the retransmission processor is further configured to transmit a number of secondary network-coded packets equal to a number of missing packets in a terminal having a greatest number of missing packets among the terminals in the group.

21. The terminal of claim 20, wherein the retransmission processor is further configured to transmit the number of secondary network-coded packets determined by the equation, $$S=<M/N>$$

wherein S denotes a number of secondary network-coded packets to be retransmitted by the terminal, M denotes a number of missing packets in the terminal having the greatest number of missing packets among the terminals in the group, and N denotes the number of terminals in the group.

22. The terminal of claim 18, further comprising:

a network decoder configured to decode a secondary network-coded packet received from the other terminals in the group, and to recover the missing packets from the secondary network-coded packet.

23. A non-transitory computer-readable medium storing instructions that, when executed by a processor, cause the processor to perform the method of claim 9.

24. A non-transitory computer-readable medium storing instructions that, when executed by a processor, cause the processor to perform the method of claim 14.

* * * * *